United States Patent [19]

Hall, III

[11] Patent Number: 4,836,341

[45] Date of Patent: Jun. 6, 1989

[54] CONTROL SYSTEM FOR A HYDRAULIC RETARDER

[75] Inventor: Arthur Hall, III, Indianapolis, Ind.

[73] Assignee: General Motors Corporation, Detroit, Mich.

[21] Appl. No.: 213,021

[22] Filed: Jun. 27, 1988

[51] Int. Cl.[4] ...................... A61D 57/00; B60T 13/16; B60T 41/24

[52] U.S. Cl. ........................................ 188/290; 303/2; 303/10; 192/4 B

[58] Field of Search ....................... 188/290, 297, 310; 303/2, 3, 10; 192/4 R, 4 A, 4 B; 91/261

[56] References Cited

U.S. PATENT DOCUMENTS

| | | | |
|---|---|---|---|
| 3,882,973 | 5/1975 | Hakes | 188/290 X |
| 4,324,320 | 4/1982 | Spurlin et al. | 188/290 X |
| 4,699,022 | 10/1987 | Stadt et al. | 192/4 B X |

*Primary Examiner*—Andres Kashnikow
*Assistant Examiner*—Timothy Newholm
*Attorney, Agent, or Firm*—Donald F. Scherer

[57] ABSTRACT

A control system includes a hydraulic pump that is driven by the output shaft of the vehicle transmission. A plurality of valve members control the inlet and outlet fluid flow of the pump so that during vehicle braking, a hydraulic retarder is supplied by the pump with hydraulic fluid drawn from a reservoir. When vehicle braking is not requested, the pump inlet is connected to the retarder to evacuate and lubricate the interior thereof.

3 Claims, 1 Drawing Sheet

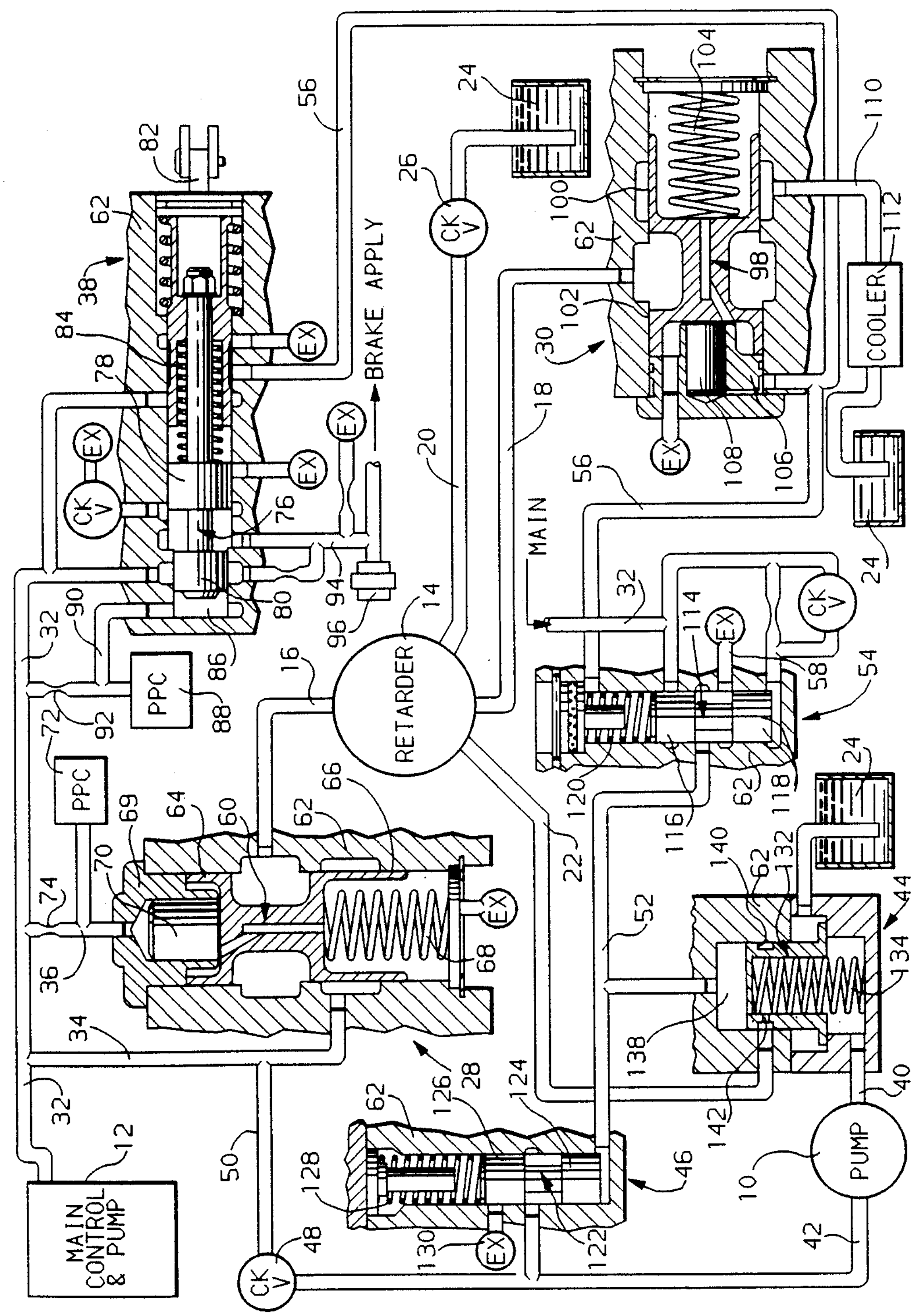
MAIN CONTROL & PUMP
RETARDER
PUMP
COOLER
BRAKE APPLY
MAIN
PPC
PPC
CK V
EX

CONTROL SYSTEM FOR A HYDRAULIC RETARDER

The invention herein described was made in the course of work under a contract or subcontract thereunder with the Department of the Army.

BACKGROUND OF THE INVENTION

This invention relates to hydraulic controls and more particularly to hydraulic controls for controlling the flow of fluid to and from a hydraulic retarder.

In prior art retarder control mechanisms, valving is utilized to direct fluid to the retarder when vehicle retardation is desired. During normal driving operation, the valving prevents fluid from entering the retarder. However, some residual fluid can remain in the retarder and the retarder otherwise is filled with air. The air and residual fluid in the retarder create parasitic losses in the transmission during normal vehicle operation. The parasitic losses reduce the overall efficiency of the transmission and result in the reduction of output power and a reduction in fuel economy.

SUMMARY OF THE INVENTION

The present invention seeks to reduce the parasitic losses by reducing the pressure within the retarder to a value below atmospheric pressure during normal operating conditions. This is accomplished by using a positive displacement pump driven by the transmission output to connect the pump inlet through the retarder during normal driving operation.

By connecting the pump inlet with the interior of the retarder, a reduced pressure and air mass within the retarder will result in a reduction of the windage losses. The pump is effective to draw some fluid from the oil reservoir, however, due to the reduced internal pressure of the retarder, an oil mist is formed which is effective to maintain lubrication of the rotating sealing surfaces within the retarder and thereby reduce the friction losses.

The pump will affect the overall efficiency of the transmission, however the pump loss is considerably less than the retarder loss would be without the present invention. Therefore, an overall increase in efficiency is attained. The combined effect of reduced internal pressure and mist lubrication may reduce the parasitic losses by up to 75% at maximum vehicle speeds.

It is therefore an object of this invention to provide an improved control mechanism for a vehicle hydraulic retarder wherein a vehicle driven pump and valving are operable to control a supply of fluid to the retarder during braking operation and to evacuate the retarder during nonbraking operation.

It is another object of this invention to provide an improved control mechanism for a vehicle driven hydraulic retarder wherein a vehicle driven pump and two control valves are operable to supply hydraulic fluid to the retarder when retardation is desired and to evacuate the retarder when retardation is not required, and wherein the pump is operable to supply pressurized fluid to a main transmission control during push start, and further wherein a signal valve is operable to condition the two control valves to attain the desired distribution of hydraulic fluid.

It is a further object of this invention to provide an improved control valve arrangement for controlling fluid flow to and from a positive displacement fluid pump which is operatively connected for fluid communication with a hydraulic retarder where a first valve selectively controls fluid flow from a reservoir or from the retarder to the pump inlet, a second valve selectively controls fluid flow from the pump outlet to the retarder or to the reservoir, and a third valve controls the first and second valves in response to one or more operating parameters of a vehicle to establish the fluid connections for the pump.

These and other objects and advantages of the present invention will be more apparent from the following specification and drawing.

DESCRIPTION OF THE DRAWING

The drawing depicts a hydraulic representation of a control valve arrangement and a fluid circuit incorporating the present invention.

DESCRIPTION OF THE EMBODIMENT

The drawing shows a hydraulic circuit in which a plurality of valve members are operable to control fluid flow from a vehicle driven pump 10 and a main transmission control and pump 12 to a hydraulic retarder 14.

The retarder 14 has an inlet passage 16 and an outlet passage 18. Also connected to the retarder 14 is a retarder lube passage 20 and a retarder evacuation passage 22. The lube passage 20 is connected with a reservoir 24 through a check valve 26 which prevents back flow from the retarder 14 to the reservoir 24. The retarder inlet passage 16 is connected to a retarder inlet valve, generally designated 28. The retarder outlet passage 18 is connected to a retarder outlet valve, generally designated 30. The main transmission control and pump 12 supplies main pressure fluid to a passage 32 which is in fluid communication through both a branch passage 34 and a branch passage 36 with the retarder inlet valve 28, the passage 32 is also in fluid communication with a brake apply regulator valve, generally designated 38.

The pump 10 has an inlet passage 40 and an outlet passage 42. The inlet passage 40 is in fluid communication with a pump inlet control valve 44 while the passage 42 is in fluid communication with a pump outlet valve 46 and a check valve 48. The check valve 48 permits fluid flow from passage 42 to passage 50 which is in fluid communication with passage 34 and therefore the retarder inlet 28 whenever the pressure in passage 48 is substantially equal to or greater than the pressure in passage 34. The pump inlet valve 44 and pump outlet valve 46 are both in fluid communication with a pump control passage 52 which is also in fluid communication with a signal valve 54. The signal valve 54 has connected thereto main passage 32, a brake apply signal passage 56 and an exhaust passage 58.

The retarder 14 is a conventional hydraulic retarder which when supplied with pressurized fluid via passage 16, will impose a retarding effort on the vehicle output, not shown. Such devices are well known and are utilized in many commercially available vehicles.

The pump 10 and main transmission control in pump 12 can be constructed in accordance with many of the commercially available devices which provide these functions. The pump 10, for example, may be a gear type pump which is operatively connected to be driven by the transmission output shaft, not shown. The main transmission and pump 12 will generally include a positive displacement pump driven by the vehicle engine, one or more regulator valves, and a plurality of shift control devices for controlling the engagement and disengagement of the various friction control elements in a transmission. Since these devices are well known, it is not believed that a more detailed description of their structure and operation is necessary at this point.

The retarder inlet valve 28 includes a spool valve 60 which is slidably disposed in a valve housing 62. The valve spool 60 has a pair of spaced lands 64 and 66. A compression spring 68 operates against one end of the valve spool 60 and urges it toward a stop member 69. In the spring set position shown, the valve spool 60 prevents fluid communication between the passage 34 and the passage 16. A plug member 70 is slidably disposed in the stop member 69 and is in fluid communication with the passage 36.

As previously mentioned, the passage 36 is in fluid communication with the passage 32 and is also in fluid communication with a solenoid control 72. The fluid flow passage 32 entering passage 36 passes through a restriction 74. The solenoid 72 is modulated between opened and closed to control the fluid pressure in passage 36.

If the solenoid 72 is closed, the fluid pressure in passage 36 will increase to a point wherein it is sufficient to overcome the force in spring 68 so that the plug 70 will move causing the valve spool 60 to open communication between passage 34 and passage 16 thereby admitting high pressure fluid to the retarder 14. The solenoid 72 will be energized whenever retardation is desired.

The brake apply regulator valve 38 includes a valve spool 76 which has a pair of spaced lands 78 and 80 slidably disposed in the housing 62. The brake apply regulator valve 38 also includes a manual plunger 82 which is longitudinally movable to compress a spring 84 disposed between the plunger 82 and the valve spool 76 to put an external or operator control force on the regulator valve 38. Land 78 is larger than land 80. Spring force is initially compensated for by fluid pressure of passage 94 acting on the differential area between lands 78 and 80. Pressure in passage 94 is modulated by the effect of increasing pressure in chamber 86. Solenoids 72 and 88 work together with electronic controls, not shown, to proportion the required braking effort between the retarder and the hydraulic plate brakes. The pulse-width-modulated solenoid 88 controls the pressure in a passage 90, and therefore chamber 86, which is in fluid communication through a restriction 92 with the main passage 32.

As previously mentioned, the main passage 32 is also connected to the brake apply regulator 38. As seen in the drawing, one of these fluid connections is controlled by valve land 80 and the other is controlled by the position of the manual plunger 82. As the force in spring 84 is increased by movement of the manual plunger 82, the valve spool 76 will be moved leftward establishing fluid communication between the passage 32 and a brake apply passage 94.

The amount of pressure in the brake apply passage 94 is controlled by the force in spring 84 and the control pressure in chamber 86. The brake apply passage 94 also communicates with a brake pressure transducer 96 which can provide the operator with an indication of brake operation and also provide a feedback signal, if desired, for the control of the pulse-width-modulated solenoid 88. When the manual plunger 82 is moved leftward, the passage 32 is connected with brake signal apply passage 56. As previously mentioned, this passage 56 is in fluid communication with the signal valve 54. The passage 56 is also in fluid communication with the retarder outlet valve 32. When the brakes are to be applied, the passage 56 will be pressurized substantially at line pressure.

The retarder outlet valve 30 includes a spool valve 98 having a pair of spaced lands 100 and 102 that are slidably disposed in the valve housing 62. A compression spring 104 urges the valve spool 98 to the position shown where it rests against a stop 106. The stop 106 slidably supports a plug 108, one end of which is in fluid communication with the brake apply passage 56. Whenever a brake apply signal is available in passage 56, the plug 108 will force the valve spool 98 to move against the spring 104 to provide fluid communication between the retarder outlet passage and a cooler passage 110. Cooler passage 110 flows through a conventional cooler 112 and then to the reservoir 24.

The signal valve 54 includes a spool valve 114 having a pair of spaced lands 116 and 118 slidably disposed in the valve housing 62. The valve spool 114 is positioned by a compression spring 120 so that valve land 116 prevents fluid communication between passages 32 and 52. In this spring set position, the passage 52 is connected to the exhaust passage 58. When main pressure is present in passage 32 and passage 56 is exhausted, main pressure acts on the end of valve land 118 to force the valve spool 114 to move against the spring 120 thereby disconnecting passage 52 from exhaust and connecting passage 52 to passage 32. This is the normal operating condition for the signal valve 54. When a brake apply signal in the form of line pressure is available in passage 56, the spring 120 and pressure from passage 56 force the valve spool 114 to the position shown thereby exhausting passage 52.

The pump outlet valve 46 includes a valve spool 122 having a pair of spaced lands 124 and 126 which are slidably disposed the valve housing 62. The valve spool 122 is urged to the position shown by a compression spring 128. In the spring set position shown, the passage 42 is blocked from an exhaust passage 130 and therefore the flow from pump 10 will pass through check valve 48 to passage 50. When the passage 52 is pressurized, the normal driving condition, valve spool 122 will be moved against spring 128 which will permit fluid communication between passage 42 and an exhaust passage 130 which is connected to the reservoir 24.

The pump inlet control valve 44 includes a hat-shaped member 132 which is slidably disposed in the valve housing 62. The member 132 is urged upward as seen in the drawing by a compression spring 134. The upward movement of the member 132 permits fluid communication between the pump inlet passage 40 and the reservoir 24. During normal driving operation when the passage 52 is pressurized, the member 132 will be forced by fluid pressure in the chamber 138 to the position shown. In this position, the retarder evacuation passage 22 is aligned with an annular groove 140 formed in the member 132. The groove 140 is in fluid communication through a passage 142 with the interior of the member 132 and therefore the inlet 40 of pump 10.

During normal driving operations with the pump inlet valve 44 in the position shown, and the pump outlet valve 46 urged against the spring 128 to permit exhausting of passage 42, the interior of the retarder will be connected to the inlet of the pump 10. The pump 10 will draw any residual fluid and air from the retarder 14. While this is very desirable, the operation will also affect the rotary sealing surfaces of the retarder and prevent lubrication thereof.

To admit some lubrication fluid, the retarder lube passage 20 is utilized to draw some fluid from the reservoir 24 into the interior of the retarder 14. Because the interior pressure of the retarder 14 is maintained below atmosphere at this time and by providing proper orifices or restrictions within the passage 20 at the retarder 14, an oil mist will be established which will provide lubrication for the sealing surfaces of the retarder 14. Since the oil mist is also at the reduced internal pressure of the retarder, little if any loss occurs because of the presence of the mist.

When the vehicle brakes are energized through manipulation of the manual plunger 82, a brake signal pressure is established in passage 56 which will cause the exhausting of the passage 52 such that the inlet valve 44 will be moved upward to its spring set positions and the outlet valve 46 will be moved to the spring set position shown. In this operating condition with the vehicle moving, the pump 10 will draw fluid the reservoir 24 and supply pressurized fluid to the passage 42. The pressurized fluid in passage 42 will pass through the check valve 48 to passage 50 where it is combined with fluid in passage 34 and delivered via the retarder inlet valve 28 to the retarder 14. With the retarder 14 filled with pressurized fluid, vehicle retardation will take place in a well known manner.

When the brake operation has ceased, the retarder 14 will be evacuated and due to the operation of the evacuation control circuit within the present invention, the evacuation of the retarder will occur much more quickly thereby further improving the operating efficiency of the vehicle.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A hydraulic retarder and control in a vehicle having an output drive means, said control comprising: a fluid reservoir; hydraulic pump means having a fluid inlet and a fluid outlet and being drivingly connected with the output drive means for providing hydraulic fluid; hydraulic retarder means for assisting in braking the vehicle when an operator brake demand is present; retarder valve means for directing fluid from said fluid outlet of said hydraulic pump means to said hydraulic retarder means when the brake demand is present; and control valve means for connecting said pump means fluid inlet with said retarder means and said pump means fluid outlet with said reservoir when the brake demand is not present, and for connecting said fluid inlet to said reservoir and said fluid outlet to said retarder valve means when the brake signal is present, said pump means drawing fluid for lubrication through said retarder means and causing a pressure less than atmospheric to be present in said retarder means when the brake demand is not present.

2. A hydraulic retarder and control comprising: a fluid reservoir; hydraulic pump means having a fluid inlet and a fluid outlet for providing hydraulic fluid; means for drivingly connecting said pump with a vehicle output drive means; operator brake demand means for establishing a brake demand signal; hydraulic retarder means for assisting in braking when a brake demand signal is present; retarder valve means for directing fluid from said fluid outlet of said hydraulic pump means to said hydraulic retarder means when the brake demand is present; and control valve means including a first selectively operable fluid valve means for selectively connecting said pump means fluid inlet with said retarder means when the brake demand signal is not present and alternatively with said reservoir when the brake demand signal is present, a second selectively operable fluid valve means for connecting said fluid outlet to said reservoir and alternatively to said retarder valve means when the brake demand signal is not present and is present respectively, and a third selectively operable fluid valve means for selectively controlling said first and second fluid valve means in response to the brake demand signal, said pump means drawing a fluid mist for lubrication through said retarder means and causing a pressure less than atmospheric to be present in said retarder means when the brake demand is not present.

3. A hydraulic retarder and control in a vehicle having an output drive means, said retarder and control comprising: a fluid reservoir; hydraulic pump means having a fluid inlet and a fluid outlet and being drivingly connected with the output drive means for providing hydraulic fluid; hydraulic retarder means for assisting in braking the vehicle when an operator brake demand is present; and control valve means including two pump flow control valve means and one signal valve means being disposed in fluid communication for connecting said pump means fluid inlet with said retarder means and said pump means fluid outlet with said reservoir when the brake demand is not present, and for connecting said fluid inlet to said reservoir and said fluid outlet to said retarder means when the brake signal is present, said pump means drawing fluid through said retarder means causing a pressure less than atmospheric to be present in said retarder means when the brake demand is not present.

* * * * *